United States Patent
Beck

(10) Patent No.: US 7,900,474 B2
(45) Date of Patent: Mar. 8, 2011

(54) HOLLOW GLASS MICROSPHERES COMPRISING SELENIUM OXIDE AND METHOD OF MAKING THEREOF

(76) Inventor: Warren R. Beck, Woodbury, MN (US)

( * ) Notice: Subject to any disclaimer, the term of this patent is extended or adjusted under 35 U.S.C. 154(b) by 435 days.

(21) Appl. No.: 12/228,520

(22) Filed: Aug. 14, 2008

(65) Prior Publication Data

US 2010/0040881 A1  Feb. 18, 2010

(51) Int. Cl.
  *B32B 5/16* (2006.01)
  *C03B 19/08* (2006.01)
  *C03B 19/10* (2006.01)
  *C03B 19/14* (2006.01)
  *C03C 12/00* (2006.01)
  *C04B 38/02* (2006.01)

(52) U.S. Cl. ............ 65/21.4; 65/83; 428/402; 501/33; 501/39; 501/84

(58) Field of Classification Search .......... 65/21.4, 65/83; 501/33, 39, 84; 428/402
See application file for complete search history.

(56) References Cited

U.S. PATENT DOCUMENTS

| | | | | |
|---|---|---|---|---|
| 3,030,215 | A * | 4/1962 | Alford et al. | 501/33 |
| 3,365,315 | A * | 1/1968 | Beck et al. | 501/33 |
| 3,607,169 | A * | 9/1971 | Coxe | 65/21.4 |
| 4,111,713 | A * | 9/1978 | Beck | 106/409 |
| 4,303,730 | A * | 12/1981 | Torobin | 428/333 |
| 4,391,646 | A * | 7/1983 | Howell | 523/219 |
| 4,448,599 | A * | 5/1984 | Mackenzie et al. | 65/21.4 |
| 4,661,137 | A * | 4/1987 | Garnier et al. | 65/21.4 |
| 4,744,831 | A * | 5/1988 | Beck | 106/409 |
| 7,506,523 | B2 * | 3/2009 | Beck | 65/21.4 |
| 2006/0122049 | A1 * | 6/2006 | Marshall et al. | 501/27 |
| 2010/0129455 | A1 * | 5/2010 | Murase et al. | 424/489 |

* cited by examiner

*Primary Examiner* — H. (Holly) T Le

(57) ABSTRACT

Hollow glass microspheres are made using selenium oxide as the blowing agent. The use of selenium oxide provides two unique advantages: lower density and smaller hollow microspheres are obtained because loss of selenium oxide gas out of the liquid glass bubble during formation is slow, and the hollow microspheres will contain a vacuum due to the condensation of selenium oxide gas blowing agent upon cooling of the spheres below 315 deg. C.

8 Claims, No Drawings

HOLLOW GLASS MICROSPHERES COMPRISING SELENIUM OXIDE AND METHOD OF MAKING THEREOF

TECHNICAL FIELD

This invention relates to hollow glass microspheres formed by using selenium oxide as the blowing agent.

BACKGROUND

Hollow glass microspheres (glass bubbles) formed by fusing solid precursor particles were first patented by Veatch (U.S. Pat. No. 3,030,215). The product was made with sodium silicate to which a blowing agent and insolubilizers were added. This precursor material, after drying, crushing and screening to the desired particle size, was put through a flame where it fused and was blown into bubbles. The product had limited durability, but was successfully used in some commercial applications.

Durable hollow glass microspheres were patented by Beck (U.S. Pat. No. 3,365,315). The technology has grown, and today there are several companies worldwide that produce and market hollow glass microspheres. These products have found many uses. An important application is as a filler in plastics where the hollow glass microspheres provide low density and high compressive strength at low cost. Many of the applications are in hydrospace and aerospace.

Most commercial silicate glass compositions can be formed into hollow spheres. The primary method is to incorporate a fraction of a percent of sulfur oxide into the batch composition, usually as sodium sulfate, and melt to a stage short of complete fining (processing molten glass to clear it of bubbles) to retain about 0.1 to 0.5% of a sulfur oxide in the quenched glass. The quenched glass is dried, pulverized, and classified to about 5 to 50 microns, then is fed through a heated gaseous stream, generally in a flame fueled by natural gas, to reheat the particle to the reboil temperature at which the sulfur oxide evolves as a gas and blows the particle into a hollow sphere. The hollow-glass-sphere-forming (bubble-forming) systems are described in several U.S. patents (See U.S. Pat. No. 4,661,137, for example).

To help visualize the invention and its utility a comparison may be made between bubble-forming precursor particles made in two different small particle sizes from the same glass; for example, glass having a density of 2.5 g/cc in particles of either 20 or 10 microns diameter. When the 20 -micron precursor particles are expanded to 40 microns in diameter during the bubble-forming process, calculations will show that the prepared bubbles will have a density of about 0.3 g/cc. and a wall thickness of 0.9 microns. By comparison, when the 10-micron glass precursor particles are blown to a 20-micron-diameter bubble, they will have a wall thickness of only about 0.45 microns and the same density of about 0.3 g/cc. The thinner wall of the smaller 20-micron-diameter bubbles will allow a faster rate of outward diffusion of gas, e.g., blowing agent, through the wall (at bubble-forming temperatures the glass structure is expanded and more easily permits diffusion of a gas through the wall of the bubble). This rapid loss is even a more severe problem with the smaller bubbles, which have a higher surface tension that increases the gas pressure within the bubble, and, with the much thinner walls of these smaller bubbles, results in even more rapid loss of gas. In conventional practice smaller precursor particles, intended to make small bubbles, lose blowing agent at a fast rate, and the bubbles shrink, thus resulting in a higher density bubble, or even a solid sphere. The smaller the particle, the more difficult it is to prevent loss of the gas and collapse of the bubble.

In my invention I overcome the prior-art difficulty in preparing small glass bubbles (hollow glass microspheres) by using selenium oxide as the blowing agent. Selenium oxide is a larger molecule than the conventionally used sulfur oxide and will diffuse through the glass wall at a slower rate. To my knowledge, selenium oxide has not been used previously as a blowing agent to form hollow glass microspheres.

Another characteristic and advantage of selenium oxide is that it is a solid at room temperature. It sublimes at 315 deg. C., and will also condense near 315 deg. C. upon cooling. Since the glass solidifies well above this temperature the condensation of the selenium oxide leaves a vacuum in the interior void of the bubble. By contrast, the commonly used sulfur-oxide blowing agent is a gas at room temperature and provides a vapor pressure within the blown and cooled bubble.

The use of selenium oxide as a blowing agent thus provides two significant advantages:

First, because $SeO_2$ is a large molecule relative to the commonly used $SO_2$, its diffusion rate through glass is slower and there is less loss of this $SeO_2$ blowing agent during the bubble-forming process. The use of selenium oxide achieves lower density (i.e., thinner wall) glass bubbles and makes possible the formation of smaller diameter bubbles.

The second advantage is the ability to create a vacuum within a bubble when $SeO_2$ is the blowing agent. Due to the fact that $SeO_2$ sublimes at 315 deg. C. it also condenses near that temperature when cooled. Thus, after the bubble is formed during the particle fusion and blowing step, a vacuum is created when the bubble is cooled below 315 deg. C. and the $SeO_2$ returns to the solid state. With selenium oxide as the sole blowing agent an essentially 100% vacuum is expected, assuming steps are taken to exclude contamination by other blowing agents. Alternatively, a partial vacuum is obtained when other blowing agents are included with $SeO_2$. The term "evacuated" is used herein to describe bubbles having at least a partial vacuum, with an internal pressure substantially below atmospheric pressure. (It may be noted that U.S. Pat. No. 3,607,169 proposed evacuated hollow glass microspheres made by using zinc or some other metal as a blowing agent, but the resulting microspheres were coated with a metal film on the inside of the sphere surface.)

Selenium or selenium oxide have been used in some commercial glasses as a decolorizing agent, and to make selenium ruby glass products, but is not known to have been introduced into bubble-forming glasses to function as a blowing agent to form hollow glass microspheres.

Selenium is known to be a necessary trace element in the diet of humans. However, the oxide $SeO_2$, like $SO_2$, is toxic in larger concentrations. Thus, it is necessary for anyone working in this field to take proper safety precautions.

DESCRIPTION OF THE INVENTION

Having given an introductory review of my hollow glass spheres I will below describe the preferred method of preparation of this product using selenium oxide as the blowing agent. Generally I expect to form bubbles of any silicate glass into which selenium oxide can be diffused or dissolved, e.g., by heating in an atmosphere of selenium oxide particles of the glass to an elevated temperature less than the glass' melting point, or by dissolving a selenate directly into the glass melt (see U.S. Pat. No. 3,365,315, which describes similar processes with sulfur dioxide or a sulfate). Thus, my invention of $SeO_2$-blown bubbles applies to most commercial glass compositions. It is known, however, that borosilicate glasses are among the most suitable for bubble-forming, and I presently prefer such glasses.

In preparing glass precursor particles the ingredients of the glass are generally mixed and melted in a conventional glass melting furnace, e.g., at a typical glass melting temperature of about 1400 deg. C. until the glass is homogeneous. The batches for preparing a bubble-forming glass composition generally are prepared using oxides, hydrates and carbonates plus a selenate such as sodium selenate (though as noted I can blend selenium oxide into already formed glass particles). Sulfates may be included, but I preferably avoid them because of the tendency of sulfur or its oxides to be retained in the glass. This would contaminate the selenium oxide blowing agent. Water and carbon dioxide are readily driven off during the melting and fining process, but selenium oxide is largely retained to act as the blowing agent. The amount of $SeO_2$ or selenium oxide can be varied, but typical amounts are about 0.1% to about 1.5% of the precursor particle (or bubble-forming glass composition), depending on the amount of blowing that is desired (although I use the expression $SeO_2$ for convenience, the exact molecular composition may vary somewhat depending on oxidation-reduction conditions). More than 1.5% is generally unnecessary, and less than 0.1% may be used where higher density bubbles are desired. Most often, at least 0.3% of the precursor composition is selenium oxide.

Once melted to a homogeneous state the glass is quenched, dried, pulverized and classified to prepare bubble-forming precursor particles. For most applications these particles are about 5 to 30 microns in size. The size-classified product is fed into a bubble former in which the glass bubble-forming composition is heated above its softening temperature and the $SeO_2$ evolves as a gas to expand the precursor particle to bubble form. As discussed above, there are several known systems for forming bubbles, and one type of former is described in U.S. Pat. No. 4,661,137. Generally in these bubble-forming processes the precursor particles are entrained in a stream of gas, usually air, and passed through a heating zone that typically comprises a flame but could be heated by an electric heater, air or in other ways. In the heating zone the precursor particles are heated, generally several hundred degrees Centigrade above their softening point, whereupon they are fused and blown by the expanding blowing agent. Thereupon, the blown bubbles are rapidly cooled to solidify them and then collected.

Without restricting my invention to any composition, I offer the following typical borosilicate glass as one example: 68.0% $SiO_2$, 9.5% $B_2O_3$, 7.0% $Na_2O$, 1.0% $Li_2O$, 9.5% CaO, 2.5% MgO, 1.5% ZnO, 1.0% selenium oxide. The batch for this glass can be formulated using the following raw materials in the amounts calculated to yield the given glass composition: 68.0 $SiO_2$, 16.8 $H_3BO_3$, 11.3 $Na_2CO_3$, 2.5 $Li_2CO_3$, 17.0 $CaCO_3$, 5.3 $MgCO_3$, 1.5 ZnO, 1.7 $Na_2SeO_4$.

A typical container glass composition, modified by eliminating sulfates and adding a selenate, can also be formed into bubbles. An example would be 72.2 $SiO_2$, 1.9 $Al_2O_3$, 9.6 CaO, 1.5 MgO, 14.6 $Na_2O$, and 0.5 $SeO_2$. The batch can be formulated by using the amounts of silica, feldspar, dolomite, soda ash, and sodium or potassium selenate calculated to yield this composition. Processing can be accomplished as above.

As an alternative, the following procedure may be used: Start with a well-fined glass cullet which may be a commercial container or window glass, or may be a specially melted and fined borosilicate glass. Crush it to minus 100 mesh. Add the desired amount of sodium selenate and thoroughly mix. Melt in a furnace to a homogeneous state. Quench, dry, mill, and classify to the desired particle size, then process in a bubble-forming furnace.

It should be understood that, when I refer to the term glass in my invention, I am including any glassy inorganic composition wherein an amorphous glass constitutes at least a part of the product.

INTENDED USES

Hollow glass microspheres with an average size smaller than 10 microns are not readily available today. Such very small bubbles are a new product with potential use in composites and the growing nanotechnology field. Such bubbles would also find use in syntactic foams as the smaller-sized fraction of bubbles in bimodal syntactic foam systems. In a preferred embodiment of my invention I prepare, as a single batch, glass bubbles that average less than 10 microns in diameter. For preparing a batch of glass bubbles that average 10 microns in diameter with a true particle density of 0.6 g/cc. and precursor glass having a density of 2.5 g/cc., precursor particles about 6 microns in diameter are used; and for lower density bubbles the precursor particles would have a smaller diameter such as 5 microns or smaller. Preferably glass bubbles of my invention have a true particle density of 0.4 or less.

One use of evacuated hollow glass spheres would be in thermal insulation applications.

I claim:

1. A method of making hollow glass microspheres comprising preparing bubble-forming precursor particles that comprise a glass composition and selenium oxide as a blowing agent; passing the precursor particles through a bubble-former in which the glass composition is heated above its softening temperature and the selenium oxide evolves as a gas to expand the precursor particle into hollow glass microspheres; and cooling the hollow glass microspheres to a solid condition.

2. A method of claim 1 wherein the selenium oxide is included in an amount of at least 0.3%.

3. Hollow glass microspheres made by the method of claim 1.

4. Hollow glass microspheres having an average diameter of 10 microns or less containing selenium oxide as the blowing agent.

5. Hollow glass microspheres of claim 4 having a true particle density of 0.4 or less.

6. Evacuated blown hollow glass microspheres containing selenium oxide as the blowing agent.

7. Hollow glass microspheres of claim 6 in which the selenium oxide has condensed to a solid state.

8. Hollow glass microspheres of claim 6 having an average diameter of 10 microns or less.

* * * * *